US010402636B2

(12) United States Patent
Liu et al.

(10) Patent No.: US 10,402,636 B2
(45) Date of Patent: Sep. 3, 2019

(54) IDENTIFYING A RESOURCE BASED ON A HANDWRITTEN ANNOTATION (71) Applicant: Hewlett-Packard Development Company, LP, Houston, TX (US)

(72) Inventors: Lei Liu, Palo Alto, CA (US); Jian Fan, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 15/522,739

(22) PCT Filed: Dec. 18, 2014

(86) PCT No.: PCT/US2014/071048
§ 371 (c)(1),
(2) Date: Apr. 27, 2017

(87) PCT Pub. No.: WO2016/099500
PCT Pub. Date: Jun. 23, 2016

(65) Prior Publication Data
US 2017/0344815 A1 Nov. 30, 2017

(51) Int. Cl.
*G06K 9/00* (2006.01)
*G06K 9/20* (2006.01)
*G06F 17/24* (2006.01)

(52) U.S. Cl.
CPC ....... *G06K 9/00409* (2013.01); *G06F 17/241* (2013.01); *G06K 9/00442* (2013.01); *G06K 9/00463* (2013.01); *G06K 9/00483* (2013.01); *G06K 9/2063* (2013.01)

(58) Field of Classification Search
None
See application file for complete search history.

(56) References Cited

U.S. PATENT DOCUMENTS

| 5,772,446 A | 6/1998 | Rosen | |
|---|---|---|---|
| 6,950,982 B1* | 9/2005 | Dourish | G06F 17/241 |
| | | | 713/1 |
| 7,373,590 B2* | 5/2008 | Woolf | G06F 17/242 |
| | | | 715/230 |
| 7,506,246 B2 | 3/2009 | Hollander et al. | |
| 7,712,028 B2 | 5/2010 | Kuruoglu et al. | |
| 8,312,385 B2* | 11/2012 | Bier | G06Q 10/10 |
| | | | 715/779 |
| 8,799,099 B2 | 8/2014 | King et al. | |
| 9,569,547 B2* | 2/2017 | Agarwal | G06F 16/951 |

(Continued)

OTHER PUBLICATIONS

Basu, S., Konishi, K., Furukawa, N., & Ikeda, H. (Nov. 2008). A novel scheme for retrieval of handwritten textual annotations for information just in time (iJIT). In TENCON 2008-2008 IEEE Region 10 Conference (pp. 1-6). IEEE. (Year: 2008).*

(Continued)

*Primary Examiner* — Michelle M Entezari
(74) *Attorney, Agent, or Firm* — HP Inc. Patent Department (57) ABSTRACT Examples herein disclose capturing an image of printed text and a handwritten annotation and determining a topic as related to the printed text in the captured image. The examples disclose identifying a resource based on the handwritten annotation.

12 Claims, 7 Drawing Sheets

(56) References Cited

U.S. PATENT DOCUMENTS

| | | | |
|---|---|---|---|
| 2007/0050360 A1 | 3/2007 | Hull et al. | |
| 2008/0141117 A1 | 6/2008 | King et al. | |
| 2012/0200519 A1* | 8/2012 | Carro | G06F 3/04883 345/173 |
| 2013/0036117 A1* | 2/2013 | Fisher | G06F 17/30029 707/736 |
| 2014/0164899 A1 | 6/2014 | Emanuel et al. | |
| 2014/0229810 A1* | 8/2014 | Ramanathan | G06F 17/241 715/202 |
| 2014/0245123 A1 | 8/2014 | Pircher et al. | |
| 2014/0281903 A1 | 9/2014 | Le Chevalier et al. | |
| 2015/0206441 A1* | 7/2015 | Brown | G09B 5/00 434/308 |
| 2015/0242383 A1* | 8/2015 | Arputharaj | H04N 5/23229 715/230 |
| 2015/0304369 A1* | 10/2015 | Sandholm | G06Q 10/10 715/753 |

OTHER PUBLICATIONS

Steimle, Jürgen, Oliver Brdiczka, and Max Mühlhäuser. "Coscribe: Using paper for collaborative annotations in lectures." In 2008 eighth IEEE international conference on advanced learning technologies, pp. 306-310. Ieee, 2008. (Year: 2008).*

Couasnon, Bertrand, Jean Camillerapp, and Ivan Leplumey. "Making handwritten archives documents accessible to public with a generic system of document image analysis." In First International Workshop on Document Image Analysis for Libraries, 2004. Proceedings., pp. 270-277. IEEE, 2004. (Year: 2004).*

Mazzei, A et al, "Extraction and Classification of Handwritten Annotations", Sep. 26-29, 2010.

* cited by examiner

IDENTIFYING A RESOURCE BASED ON A HANDWRITTEN ANNOTATION

BACKGROUND

The learning process may include the use of printed media, such as books, newspapers, articles, and/or other types of hard copied printed media. As such, a student may interact with this printed media to engage in the exchange of information and/or ideas.

BRIEF DESCRIPTION OF THE DRAWINGS

In the accompanying drawings, like numerals refer to like components or blocks. The following detailed description references the drawings, wherein.

DETAILED DESCRIPTION

Students use printed media such as casebooks, textbooks, and/or printed books to engage in the learning process. The printed media presents information on a hard copied medium and is tailored for a group of students according to subject matter. As such, learning emphasis may vary from student to student, thus making it more difficult to personalize learning resources to each student based on these printed books. Additionally, the learning resources may be personalized from electronic books, but personalization from printed books may be infeasible. Further, using an optical character recognition (OCR) approach is not always accurate in converting the printed text to machine-readable text.

To address these issues, examples disclosed herein provides a personalization of recommending a resource to aid a user in the learning process. The examples capture an image of printed text and a handwritten annotation. The printed text includes content in a hard copied medium and the handwritten annotation emphasizing a portion of this content. As such, the handwritten annotation may vary from student to student as each student may emphasize different portions of content. For example, the handwritten annotation includes those notes added to the printed text by the student and/or additional highlighting of the printed text. The examples may proceed to identify a topic related to the printed text within the captured image. Identifying the topic provides a context, such as an underlying concept, of the captured image. Using the identified topic and the handwritten annotation, the examples may identify a resource as a learning tool for delivery to the student. The resource serves as the learning tool in that the resource clarifies the handwritten annotation in the context of the printed text by providing additional information to the student. Providing the resource based on the handwritten annotation personalizes learning resources for each student related to each captured portion of printed text.

Additionally, the examples may identify multiple resources and evaluate each of the multiple resources in accordance with the handwritten annotation and prior user activity. Evaluating the multiple resources enables the examples to identify a more personalized resource to the user. This provides an additional level of personalization for each student. For example, if two students capture similar images from their textbook, each student may have a different handwritten annotations emphasizing different content in the captured image. Thus if one student has a previous user history of watching videos over reading webpages, this activity is taken into consideration when identifying the resource for delivery to the that first student.

As such, the examples disclosed herein provide a mechanism for personalizing the learning process based on a handwritten annotation in printed media. The examples facilitate the learning process by recommending a resource to aid in clarification of the handwritten annotation in the context of the captured image.

Figure 1:
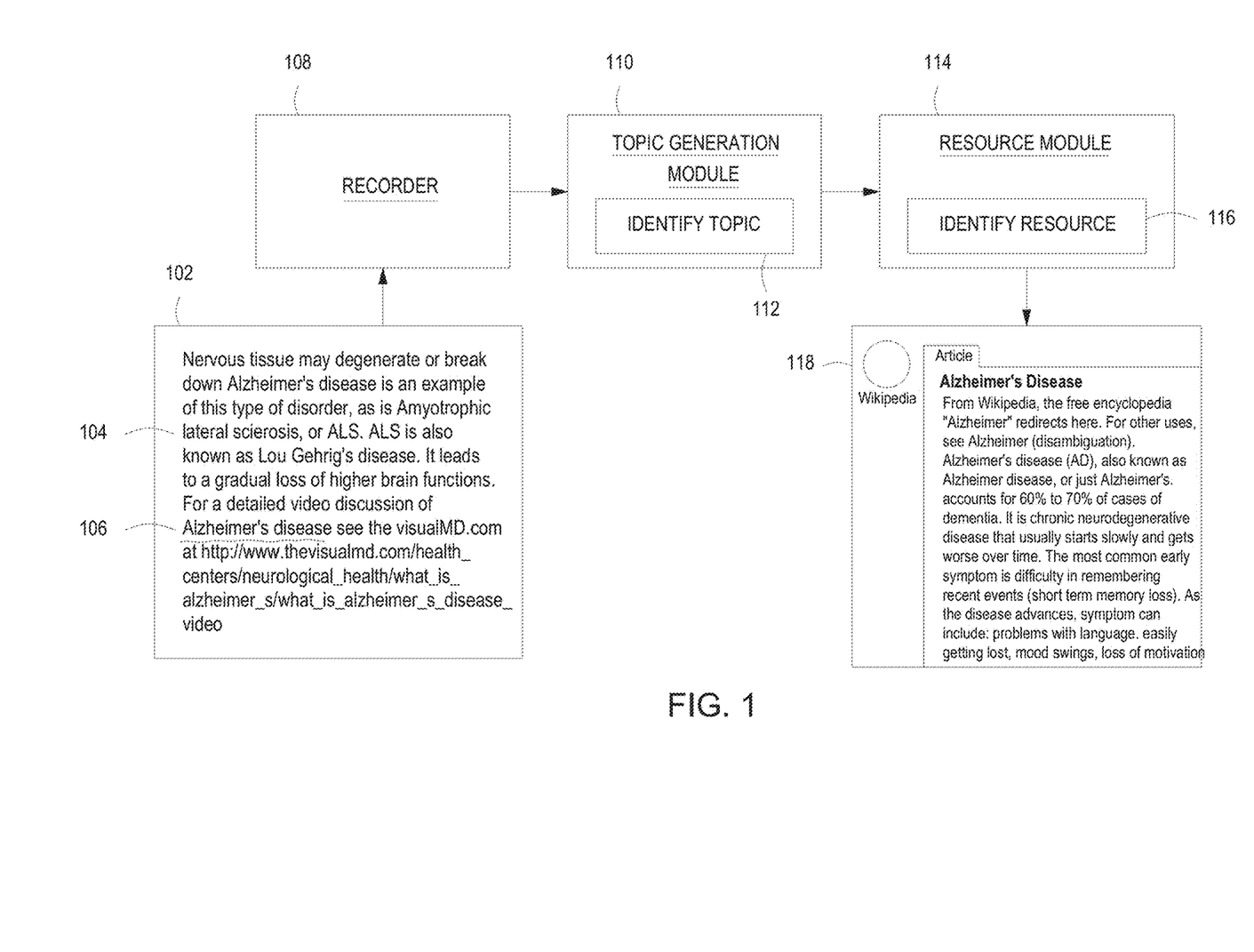
FIG. 1 is a block diagram of an example system to deliver an identified resource based on a handwritten annotation and topic of printed text in a captured image.

Referring now to the figures, FIG. 1 is a block diagram of an example system to deliver an identified resource 118 based on a handwritten annotation 106 and a topic related to printed text 104 within a captured image 102. The system includes a recorder 108 to capture the image 102 of printed text 104 and the handwritten annotation 106. Upon the recorder 108 capturing the image 102, a topic generation module 110 identifies a topic at module 112 related to the printed text 104 of the captured image 102. The identified topic at module 112 and the handwritten module 106 is used by a resource module 114 to identify a resource at module 116. Upon identifying the resource at module 116, the system delivers an identified resource 118 as a learning tool to aid in understanding the handwritten annotation 106 in context of the printed text 104. The system in FIG. 1 represents a computing device which receives the captured image 102 and in response operates in a background process to identify the resource at module 106 for delivery. As such, implementations of the system in FIG. 1 include an electronic device, mobile device, client device, personal computer, desktop computer, laptop, tablet, or other type of electronic device capable of capturing the image 102 including the handwritten annotation 106 and providing the identified resource 118. Additionally, although FIG. 1 illustrates the system as including the recorder 108 and modules 110 and 114, implementations should not be limited as the system may further include a display to provide the identified resource 118 to a user.

The captured image 102 includes printed text 104 and the handwritten annotation 106. The captured image 102 is considered the subset of printed text 104 included in a full document. As such the captured image may include, by way of example, a paragraph, sentence, words, or other type of content from the hard copy of the document. The user may desire to learn more about a smaller aspect to the document and as such may focus an input device to capture that image 102.

The printed text 104 represents the content as presented in printed media. The printed text 104 represents that text or content which is presented in the published printed media, such as a casebook, text book, article, printed document, newspaper, etc. As such, the printed text 104 represents that content which is in hard copy form. For the user to obtain the resource for learning more about the content, the printed text 104 is captured in a medium such as an image, video, etc. This captured image 102 is then used as input for the system to obtain a machine-readable version of the printed text 104 for processing to identify the resource at module 116. In this implementation, the system identifies a document which represents an electronic version of the overall printed media. In this manner, the printed text 104 captured in the image may be a shorter amount of content than the overall printed media. For example, the document may consist of multiple paragraphs while the printed text 102 represents a subset of content in the document which the user may be seeking additional information. This implementation is explained in detail in the next figure.

The handwritten annotation 106 is metadata (e.g., comment, explanation, markup, etc.) associated with the printed text 104 for emphasizing that specific content or text within the captured image 102. The handwritten annotation 106 is considered personal to each user as the user creates the handwritten annotation 106 to emphasize portions or regions of content or text in the captured image 102. Such handwritten annotations 106 indicate different emphasis on different content within the printed text 104. For example, user A and user B may capture the same paragraph, but may underline different portions of the printed text 104. Thus, the resource identification at module 116 takes into account these different types of handwritten annotations 106 to deliver the resource 118 to aid in understanding that handwritten annotation 106. Implementations of the handwritten annotation 106 include, by way of example, a highlight, underline, comment, footnote, markup, tag, link, explanation or other type of metadata to emphasize a particular portion of printed text 104. For example, the handwritten annotation 106 in FIG. 1 underlines the text, "Alzheimer's Disease," indicate the emphasis for that user on that text.

The recorder 108 is a device which captures the image 102 as input to the topic generation module 110. Implementations of the recorder 108 include, by way of example, a camera, video camera, or other type of image capturing device.

The topic generation module 110 receives the captured image 102 and identifies the topic at module 112 as related to the printed text 104 of the captured image 102. In an implementation, the topic generation module 110 may retrieve the document corresponding the printed text 104 from a database. This document provides the machine-readable text for processing to identify the topic at module 112. In this implementation, the topic generation module 110 uses a statistical model on the machine-readable text to identify the topic. This implementation may be discussed in detail in a later figure. The topic generation module 110 may include, by way of example, instructions (e.g., stored on a machine-readable medium) that, when executed (e.g., by a processor and/or controller), implement the functionality of module 112. Alternatively, or in addition, the module 110 may include electronic circuitry (i.e., hardware) that implements the functionality of module 112 to identify the topic as related to the printed text 104.

At module 112, the topic generation module 110 identifies the topic as related to the printed text 104 within the captured image 102. In one implementation, the topic generation module 110 uses a statistical model to determine a frequency and/or distribution of words within a region (e.g., subset) of the document to identify the topic. Identifying the topic at module 112, the system identifies the resource(s) at module 116 to provide to the user. Implementations of the module 112 include an instruction, set of instructions, process, operation, logic, technique, function, firmware, and/or software executable by a computing device (e.g., processor and/or controller) to identify the topic as related to the printed text 104.

The resource module 114 identifies the resource at module 116 based on the handwritten annotation 106 and identified topic at module 112. In this implementation, the resource module 114 may extract the handwritten annotation 106 from the captured image 102 through a pixilation process or other type of process to determine the location of the handwritten annotation 106 to identify the emphasized content and/or text. In other implementations, the resource module 114 may obtain multiple resources, each resource considered related to a different topic in the printed text 104. As such, the resource module 114 may provide a relevance measurement to identify the resource 118 for delivery to the user amongst the multiple resources. The resource module 114 may include, by way of example, instructions (e.g., stored on a machine-readable medium) that, when executed (e.g., by a processor and/or controller), implement the functionality of module 116. Alternatively, or in addition, the module 114 may include electronic circuitry (i.e., hardware) that implements the functionality of module 116.

At module 116, the system identifies the resource which may be related to the handwritten annotation 106 as in the captured image 102. In this implementation, module 116 may include extracting the handwritten annotation 106 for identifying the resource 118 which is most applicable to the handwritten annotation 106 for that user. This provides a level of personalization in that the handwritten annotation 106 may vary from user to user. Implementations of the module 116 include an instruction, set of instructions, process, operation, logic, technique, function, firmware, and/or software executable by a computing device to identify the resource.

The identified resource 118 serves as the learning tool for the handwritten annotation 106 within the context of the printed text 104 of the captured image 102. To deliver the identified resource 118 to the user, the system may include a display module in which to provide the identified resource 118. The identified resource 118 is an electronic document for use as learning tool to aid the user with regards to the handwritten annotation 106. As such implementations of the identified resource 118 include, by way of example, an electronic book, article, webpage, electronic media, hyperlink, etc. In another implementation, the presentation of the identified resource 118 may depend on previous user activity. For example, if the user tends to use more videos to learn about concepts rather webpages, the identified resource 118 may be delivered as the video.

Figure 2A:
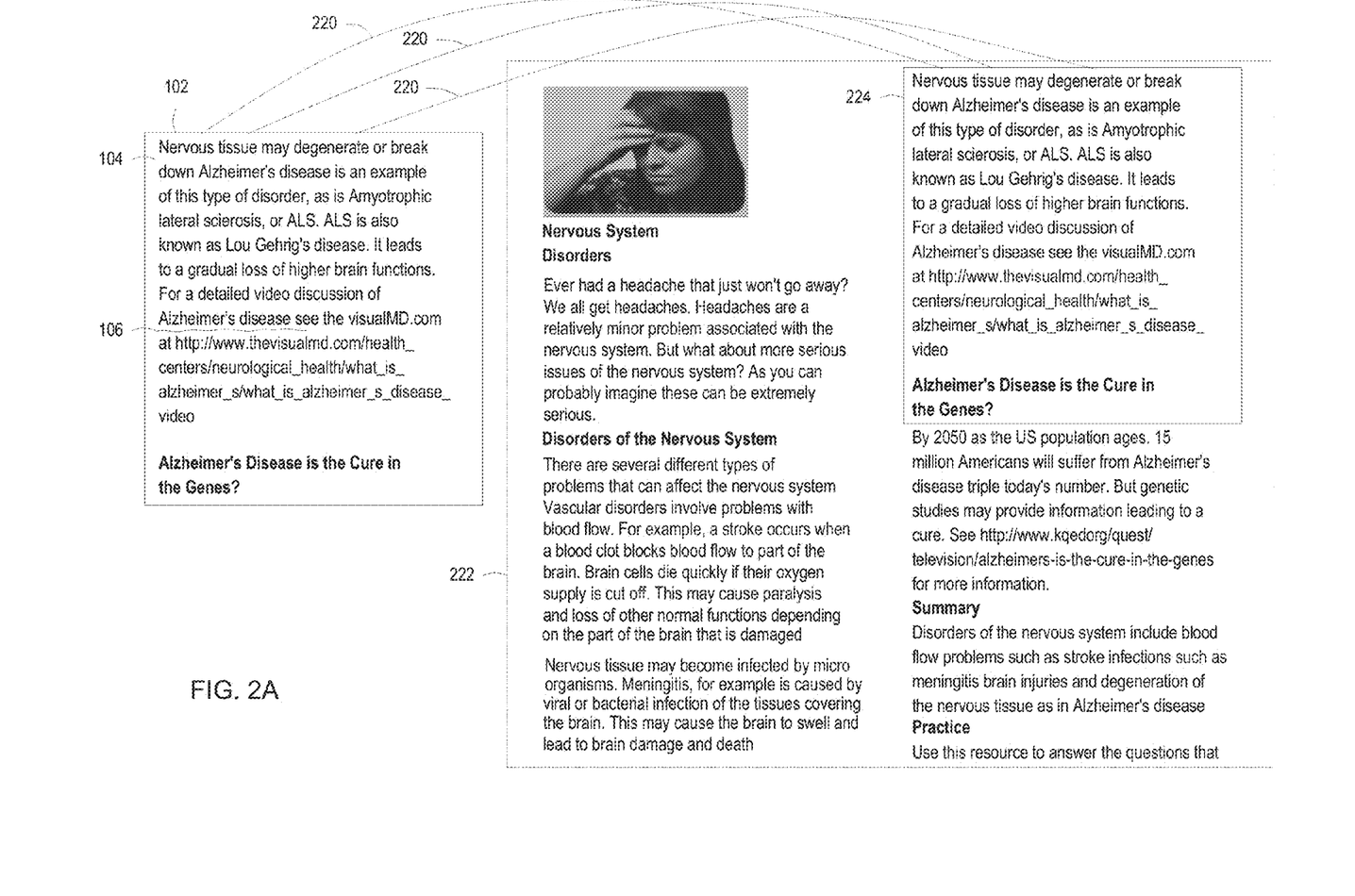
FIG. 2A is a data diagram of an example captured image including multiple feature point(s) to identify a corresponding document.

FIG. 2A is a data diagram for retrieving a document 222 by matching multiple feature points 220 from printed text 104 in a captured image 102. A computing device may receive the captured image 102 as input for processing to identify the document 222 and a portion 224 of the document. The captured image 102 includes the printed text 104 and a handwritten annotation 106. The multiple feature points 220 represent identifying content from the captured image 102 for matching to the document 222. The document 222 may be retrieved from a database and serves as a way of providing the machine-readable text to the computing device for processing. Upon identifying the document 222 through the match of the feature points 220, the computing device proceeds to identify which portion or region of content 224 within the document 222 corresponds to the printed text 104. The portion of content 224 within the document 222 provides the accurate machine-readable text to the computing device for processing.

The feature points 220 are those identifying features within the captured image 102 used by the computing device to match to the document 222. As such the feature points 220 may include, by way of example, text, words, sentences, or other identifying type of objects. For example, as illustrated in FIG. 2A, the features points 220 consists of words (e.g., nervous, tissue, and degenerate) which are used to find the document from the database that may include multiple documents. In addition, these feature points 220 are also used to reveal the portion 224 of content corresponding to the captured image 102. Identifying the portion 224 of content corresponding to the captured image 102, provides more accurate content to the computing device to process for recommending a resource.

Figure 2B:
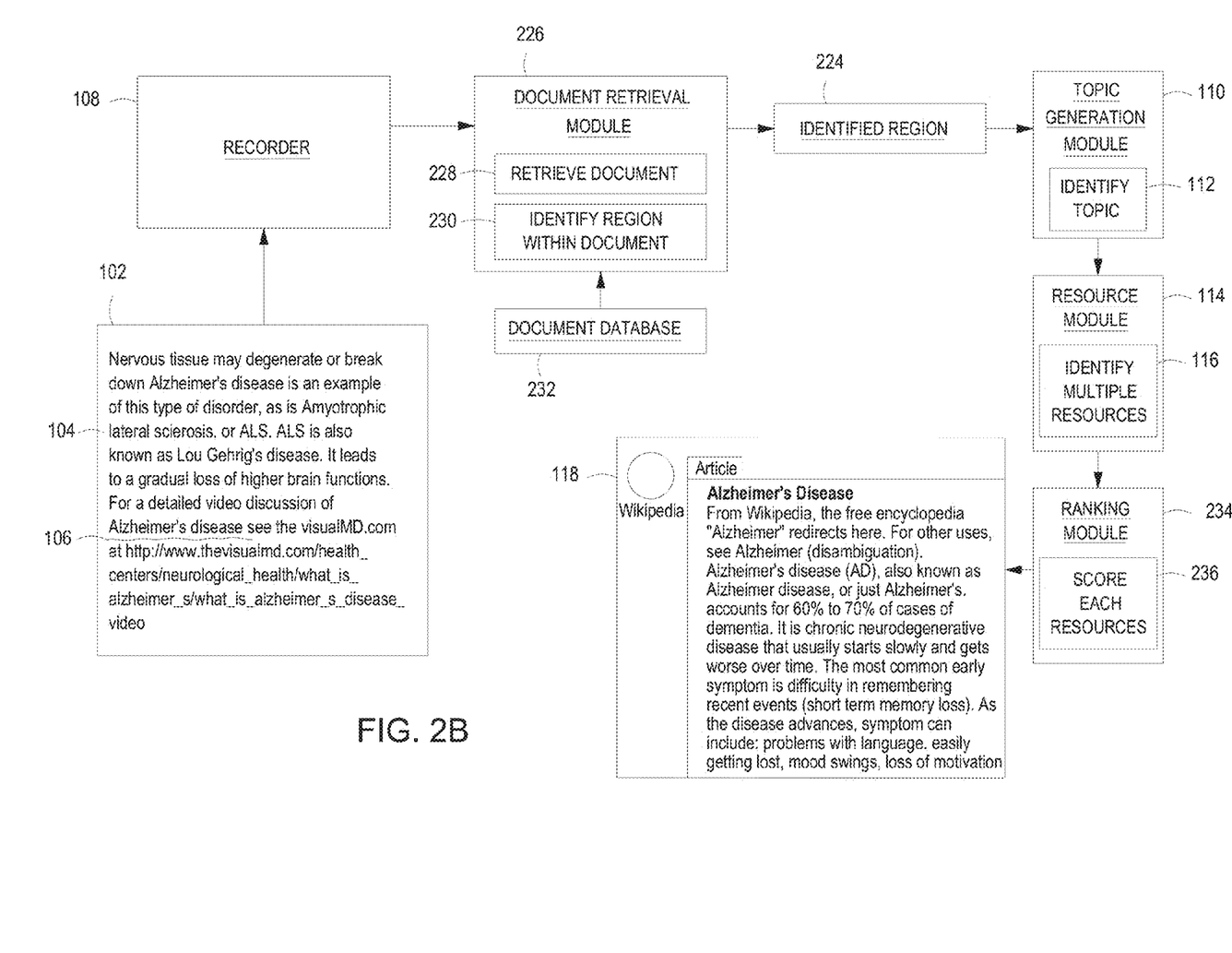
FIG. 2B is a block diagram of an example system deliver a resource as identified among multiple resources based on a ranking evaluation for each of the multiple resources.

FIG. 2B is a block diagram of an example system to deliver an identified resource 118 based on a ranking evaluation for multiple resources. A recorder 108 captures an image 102 with printed text 104 and a handwritten annotation 106. A document retrieval module 226 receives the captured image 102 and retrieves a document at module 228 from a document database 232. From the retrieved document at module 228, the document retrieval module 226 identifies a region within the document at module 230 for determining a subset of electronic content within the retrieved document that corresponds to the printed text 104. A topic generation module 110 receives the identified region 224 of content within the document and identifies a topic at module 112. A resource module 114 receives the identified topic at module 112 and identifies multiple resources at module 116. A ranking module 234 evaluates each of the identified multiple resources through a score of relevance for each of the multiple resources at module 236. The score of relevance provides a measurement of relevance for each of the multiple resources taking into consideration personalized factors such as the handwritten annotation 106 and other user activity. In this implementation, the handwritten annotation 106 may be extracted by one or combination of the modules 226, 110, 114, and 234. The handwritten annotation 106 may be extracted through a pixilation process to identify a location of the annotation within the identified region 224 of content. This enables the system to identify which content or text may be emphasized by the handwritten annotation 106. Thus, this information may be used in addition to the other user activity to score each of the multiple resources. Implementations of the user activity is discussed in a later figure.

Figure 3:
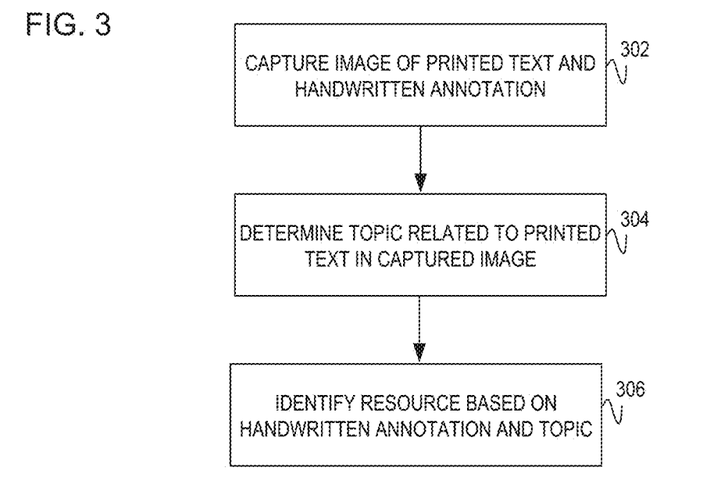
FIG. 3 is a flowchart of an example method to identify a resource based on a handwritten annotation and topic as identified by content within a captured image of printed text.

FIG. 3 is a flowchart of a method, executable by a computing device, to identify a resource based on a handwritten annotation and topic. The topic is identified by content within a captured image of printed text. The computing device captures the image of printed text and the handwritten annotation. Upon capturing the image of printed text and the handwritten annotation, the computing device determines a topic related to the content of the printed text within the captured image. Based on the determined topic, the computing device identifies a resource related to the determined topic and the handwritten annotation. In discussing FIG. 3, references may be made to the components in FIGS. 1-2B to provide contextual examples. In one implementation of FIG. 3, the modules 110 and 114 as in FIG. 1 operate on the computing device to perform operations 302-306. In this implementation, the operations 302-306 may operate as a background process on the computing device upon receiving the captured image. Further, although FIG. 3 is described as implemented by the computing device, it may be executed on other suitable components. For example, FIG. 3 may be implemented by a controller (not illustrated) or in the form of executable instructions on a machine-readable storage medium 604 as in FIG. 6.

At operation 302, the computing device captures the image of printed text including the handwritten annotation. A user may choose to capture a portion of printed text with the handwritten annotation to understand more about the underlying concept or topic of the printed text with regards to the handwritten annotation. As such, the user may direct a recording device at the portion of written text to understand more about the content.

At operation 304, the computing device determines the topic related to the printed text in the captured image. At operation 304, the computing device obtains the captured image and identifies a document which includes the region of printed text from the captured image. This enables the computing device to obtain an electronic version of the content in the captured image. Using the region of printed text in the document, the computing device obtains the electronic content of the printed text in the captured image. Using the electronic content, the computing device may determine which text (e.g., words) appear more or less frequently to identify the topic related to the printed text. Identifying the topic related to the printed text, provides a context of the printed text to identify a resource to aid the user in the learning process as at operation 306.

At operation 306, the computing device identifies the resource based on the handwritten annotation and the topic as determined at operation 304. At operation 306, the computing device may extract the handwritten annotation from the captured image to determine which content (e.g., words) were emphasized by the user. Extracting the handwritten annotation may include using a pixilation type process to identify what area in captured image is being emphasized. As such, the computing device may use the electronic content obtained at operation 304 to identify specific text that is being emphasized. Upon identifying the resource, the computing device may deliver the resource to the user as a tool in the learning process to understand the handwritten annotation in the context of the printed text of the captured image. In another implementation, user activity may also provide guidance to the computing device to identify the resource to the user. This implementation is described in detail in a later figure.

Figure 4:
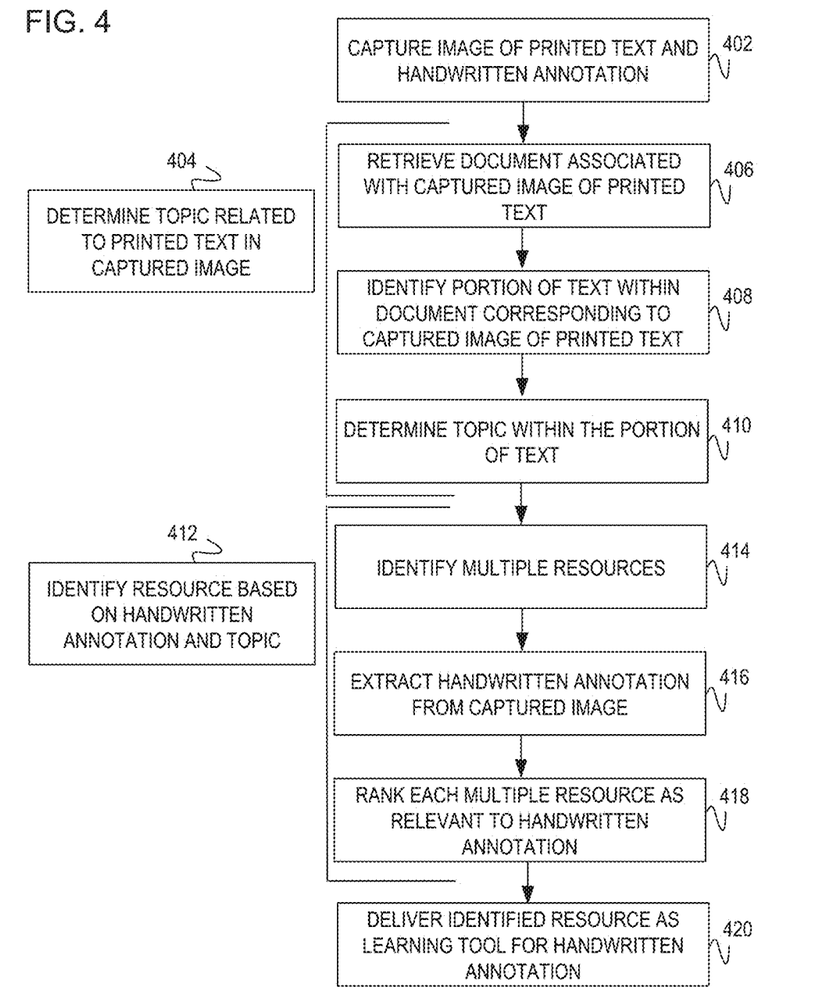
FIG. 4 is a flowchart of an example method to capture an image of printed text including a handwritten annotation and to identify a resource based on the handwritten annotation and content within the printed text.

FIG. 4 is a flowchart of a method, executable by a computing device, to capture an image of printed text including a handwritten annotation and based on the handwritten annotation and content within the printed text, identify a resource. FIG. 4 illustrates how the computing device determines a topic as related to the printed text in the captured image and identifies the resources based on the handwritten annotation and determined topic. In discussing FIG. 4, references may be made to the components in FIGS. 1-2B to provide contextual examples. In one implementation of FIG. 4, the modules 110 and 114 as in FIG. 1 operate on the computing device to perform operations 402-420. In this implementation, the operations 402-420 may operate as a background process on the computing device upon receiving the captured image. Further, although FIG. 4 is described as implemented by the computing device, it may be executed on other suitable components. For example, FIG. 4 may be implemented by a controller (not illustrated) or in the form of executable instructions on a machine-readable storage medium 604 as in FIG. 6.

At operation 402, the computing device captures the image of printed text including the handwritten annotation. The printed text is considered media which may be published in printed media. As such implementations of the printed text include, by way of example, a textbook, casebook, printed book, printed article, etc. The media enables the user to mark up the printed text by way of the handwritten annotation thus emphasizing certain regions of content. Operation 402 may be similar in functionality to operation 302 as in FIG. 3.

At operation 404, the computing device determines the topic related to the printed text in the captured image. In one implementation, the computing device identifies a document from the database and from the document, the region or portion of text which corresponds to the captured image as at operations 406-408. Operation 404 may be similar in functionality to operation 304 as in FIG. 3.

At operation 406, the computing device retrieves the document associated with the captured image of printed text. The document is considered an electronic version of the printed text captured in the image, thus producing machine-readable text for identifying underlying topics and the corresponding resources, accordingly. As such, the document is considered an amount of content which is longer in length that the printed text in the captured image. This enables the user to capture a smaller amount of content to better understand the context of the captured image, etc. The computing device may retrieve the document from a database of multiple documents. Retrieving the document from the database provides the computing device with the electronic content corresponding to the printed text in the captured image. The computing device may use feature point(s) within the printed text of the captured image which serve as an identifying feature(s) for the computing device to identify the document most similar to the printed text in the captured image. The feature point(s) may include, by way of example, words, sentences, paragraphs, or other identifying type of objects. For example the feature point(s) may include specific words in the printed text, thus using these specific words, the computing device may locate the corresponding document. Using these feature point(s), the printed text in the captured image may be corrected for geometric distortions to align with the document, this provides more accurate content for the computing device to recommend the resource.

At operation 408, the computing device identifies that portion or region of content within the document that corresponds to the captured image of printed text. The portion of the document includes that portion of content within the document that is most similar to the printed text. Thus rather than processing the full document, the computing device processes the smaller amount of content (e.g., the region within the document). This enables the computing device to view which part of the document the user may have captured. Further, using the region of content within the document, the computing device may use identify which content or text is emphasized by the handwritten annotation. In this implementation, the computing device may process the captured image through pixilation to identify what the user may have marked. This enables the computing device to narrow the content for identifying the specific word(s), sentence(s) the user may seek clarification.

At operation 410, the computing device identifies those topic(s) which may be covered in the portion or region of content identified from the retrieved document. The topic(s) is considered an underlying concept to the region within the document. For example, the retrieved document may include multiple concepts such as neurodegenerative disorders, yet the region of content within the document may include a subset of those disorders, such as Alzheimer's. Thus using the region of content, the computing device may identify those subsets of underlying concepts. In one implementation, the computing device identifies keywords from the region within the document to extract the underlying topic within the region of content. In another implementation, the computing device uses a statistical model, such as a topic model, to determine a frequency and/or distribution of words to identify the underlying context. Identifying those topic(s) relevant to the region of content within the document, the computing device may identify the resource. In another implementation, the computing device may extract multiple topics from the region of content. In this implementation, upon extracting the multiple topics, the computing device may proceed to identify multiple resources as at operation 414.

At operation 412, the computing device identifies the resource based on the handwritten annotation and the determined topic related to the content of the printed text. In one implementation, the computing device performs operations 414-418 to identify the resource for delivery. Operation 412 may be similar in functionality to operation 306 as in FIG. 3.

At operation 414, the computing device identities multiple resources, each resource is considered related to each topic. Each of the multiple resources are electronic media which may be delivered to the user to aid in the understanding of the handwritten annotation with regards to the context or underlying topic of the captured image. The multiple resources may be retrieved from a database or through an engine to obtain a resource related to each topic. Thus, obtaining multiple resources, the computing device may evaluate each resource to identify which resource is most related to the handwritten annotation and context of the printed text in the captured image as at operation 418.

At operation 416, the computing device extracts the handwritten annotation from the captured image. In this implementation, the computing device may use a pixilation process to identify which content or text from the captured image may be emphasized from the handwritten annotation. Using this handwritten annotation, the computing device may identify which resources may be more relevant to the underlying topic of the printed text.

At operation 418, the computing device ranks each of the multiple resources identified at operation 414. The ranking at operation 418 provides a mechanism in which to provide a relevance value for each of the multiple resources to the region of the document, handwritten annotation, and topic. For example, the relevance may capture the explicit similarity between the content in the region and each of the resources through a semantic feature generator. In another example, student A and B may capture the same paragraph from a textbook, but may have different handwritten annotations which may indicate the emphasis on different topics in the paragraph. Thus, various weights may be placed on each of the multiple resources in relation to the handwritten annotation. For example, depending on which content the handwritten annotation emphasizes, the resource may be ranked higher or lower in accordance with this handwritten annotation. Additionally, the relevance value may also take into consideration other user activity. For example, if one student watches more videos rather than webpages, the resources of videos may be ranked higher.

At operation 420, the computing device delivers the identified resource to the user. The identified resource serves as the learning tool for the handwritten annotation within the context of the printed text of the captured image. To deliver the identified resource to the user, the computing device may include a display module in which to provide the identified resource.

Figure 5:
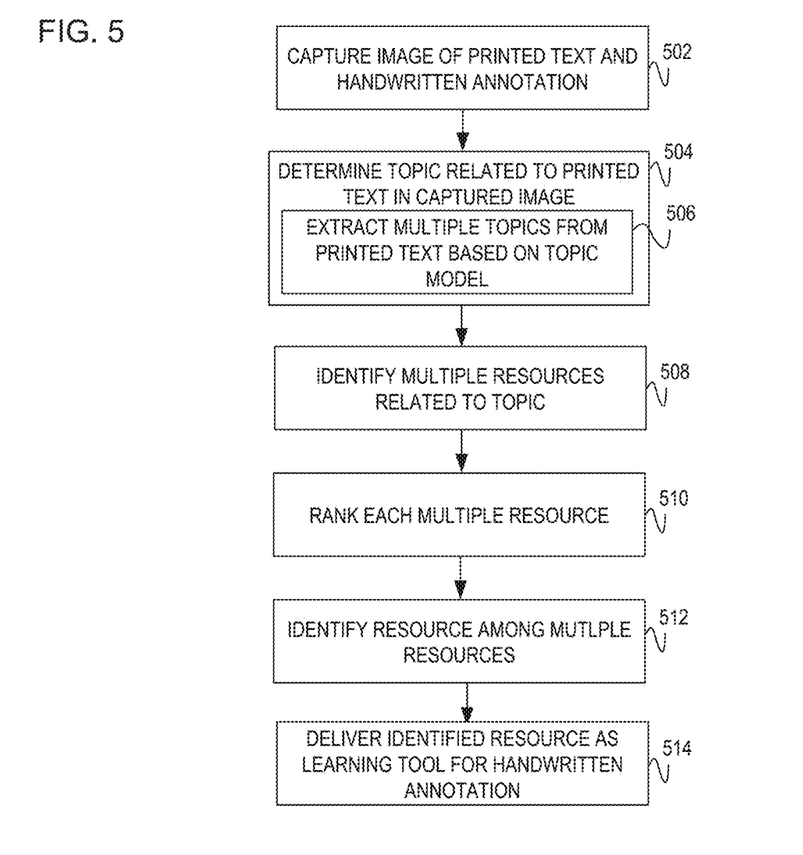
FIG. 5 is flowchart of an example method to capture an image of printed text including a handwritten annotation and to deliver a resource as a learning tool for the handwritten annotation.

FIG. 5 is a flowchart of a method, executable by a computing device, to capture an image of printed text including a handwritten annotation. The computing device may proceed to deliver a resource as recommended in accordance with the printed text and the handwritten annotation. The computing device captures the image of printed text including the handwritten annotation which emphasizes at least a portion of content within the printed text. The computing device determines a topic related to the printed text in the captured image by retrieving a document associated with the printed text. Upon retrieving the document, the computing device identifies a portion or region of text within the document that corresponds to the printed text in the captured image. Identifying the portion of region of content within the document that corresponds to the printed text, the computing device identifies at least one underlying topic within the region of content. Upon identify the topic from the region of the document, the computing device identifies multiple resources related to the topic. Each of the multiple resources are ranked in accordance to which topic may be more closely related to the topic and/or the handwritten annotation. Using the rankings of the multiple resources, the computing device identifies the resources among the multiple resources for delivery as a learning tool. The resource is considered the learning tool in the sense the resources provides additional information over the handwritten annotation in the context of the printed text. In discussing FIG. 5, references may be made to the components in FIGS. 1-2B to provide contextual examples. In one implementation of FIG. 5, the modules 110 and 114 as in FIG. 1 operate on the computing device to perform operations 502-514. In this implementation, the operations 502-514 may operate as a background process on the computing device upon receiving the captured image. Further, although FIG. 5 is described as implemented by the computing device, it may be executed on other suitable components. For example, FIG. 5 may be implemented by a controller (not illustrated) or in the form of executable instructions on a machine-readable storage medium 604 as in FIG. 6.

At operation 502, the computing device captures the image of printed text including the handwritten annotation. In another implementation, a user may decide to learn more about the context of a particular region in a printed document. In this implementation, the user may use the computing device to capture the region of the printed text which the user may desire additional information. Operation 502 may be similar in functionality to operations 302 and 402 as in FIGS. 3-4.

At operation 504, upon obtaining the captured image of the printed text and handwritten annotation, the computing device determines the topic related to the printed text in the captured image. The computing device may use a feature point, such as word or other identifying feature, to locate a match from a database which consists of a number of documents. Each document is considered a longer amount of content than the printed text in the captured image. This enables the user to capture a smaller amount content rather than the full document. Additionally, using the feature point(s), the captured image may be correct for geometric distortions and aligning to the identified document. Upon identifying the document, a portion or region of this document corresponds to the captured image. Using the portion of region of the document, the handwritten annotation may be determined at a pixel-level to identify which text or content is emphasized. For example, underlining a word or sentence may indicate the user desires additional information on that text. Furthermore, using the region of portion of the document corresponding to the captured image, enables the computing device to process a smaller amount of content to determine the topic. The computing device determines the topic by determining a frequency and/or distribution of particular words within the region of text in the document. In this implementation, the computing device utilizes a topic model or statistical model to extract sets of words or text to describe the underlying topic or concept. Operation 504 may be similar in functionality to operations 304 and 404 as in FIGS. 3-4.

At operation 506, the computing device extracts multiple topics from the printed text based on the topic model described in connection with operation 504. At operation 506, the computing device identifies which region or portion of the document retrieved from the database corresponds to the captured image. As such, the computing device obtains machine-readable text from the region or portion of the document to identify which words or text appear more or less often. Using the frequency and distribution of words or text, the computing device may extract the multiple topics from the content corresponding to the captured image of printed text.

At operation 508, the computing device identifies multiple resources, each resource related to each of the extracted multiple topics. Using the statistical model, the computing device may group together sets of words or text to determine an overall topic. Using the topic, the computing device retrieves the multiple resources. Each of the multiple resources are ranked at operation 510 to identify which resources may best aid the user in understanding the material in the captured image.

At operation 510, the computing device ranks each of the multiple resources as a way of determining which of the multiple resources are more related to the extracted multiple topics and the handwritten annotation. At operation 510, a relevance score may be assigned to each of the multiple resources. The relevance score may be based on the explicit similarity between the region or portion of the document and each of the multiple resources. In this implementation, each of the multiple resources are compared to the portion of content through a semantic feature. Additionally, the relevance score may also include how relevant each resource may be to the handwritten annotation. As such, the handwritten annotation may be extracted through a pixilation process as to identify which text or content may be emphasized in the region or portion of the document. Thus, if one of the resources covers the specific text which may be highlighted by the written annotation, the ranking or score of the resource may be more relevant than other resources. In this implementation, the handwritten annotation is considered personal to the user as each user may have different handwritten annotations thus emphasizing different areas for learning. For example, if student A and B capture a similar paragraph from their textbook, they each may have different underlining thus indicating the emphasis on different portions and/or topics in the paragraph. In a further implementation, the resources may also take into consideration prior user activity. For example, if the user watches more videos rather than reading webpages, this may indicate the user prefers multimedia to the plain text. Thus resources emphasizing the multimedia may be ranked higher than plain text. Ranking each of the multiple resources, the computing device may identify which of the multiple resources may be most helpful to the user based on the handwritten annotation and content of the printed text in the captured image.

At operation 512, the computing device identifies the resource among the multiple resources for delivery at operation 514. Operation 512 may be similar in functionality to operations 306 and 412 as in FIGS. 3-4.

At operation 514, the computing device delivers the identified resource. The identified resource is the learning tool provided to the user as mechanism for understanding the handwritten annotation in relation to the printed text in the captured image. As such the identified resource may include, by way of example, an article, document, hyperlink, or other type of electronic media to aid the user in learning the context of the handwritten annotation in the captured image. Operation 514 may be similar in functionality to operation 420 as in FIG. 4.

Figure 6:
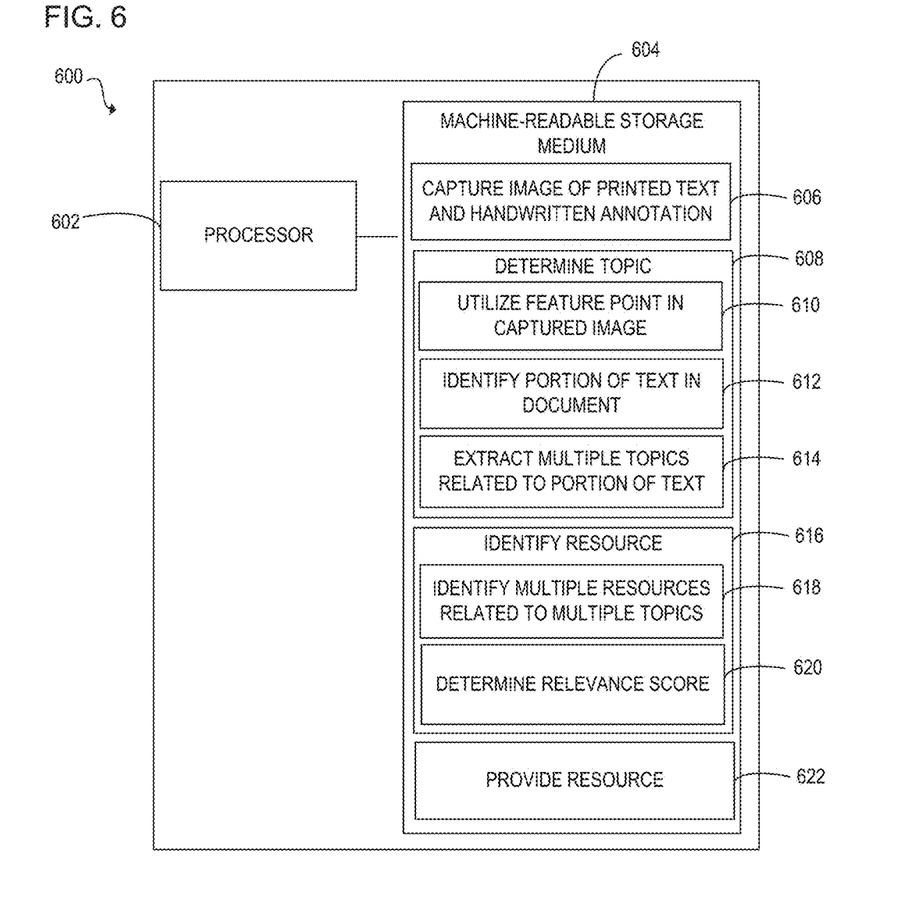
FIG. 6 is a block diagram of an example computing device with a processor to execute instructions in a machine-readable storage medium for providing a resource based on a handwritten annotation and content within a captured image.

FIG. 6 is a block diagram of computing device 600 with a processor 602 to execute instructions 606-622 within a machine-readable storage medium 604. Specifically, the computing device 600 with the processor 602 captures an image of printed text and a handwritten annotation. Upon determining a topic related to content within the printed text, the processor 602 may proceed to identify a resource based on the handwritten annotation and topic. Upon identifying the resource, the resource is provided as a learning tool to clarify the handwritten annotation in the captured image. Although the computing device 600 includes processor 602 and machine-readable storage medium 604, it may also include other components that would be suitable to one skilled in the art. For example, the computing device 600 may include a recorder 108 and/or modules 110 and 114 as in FIG. 1. The computing device 600 is an electronic device with the processor 602 capable of executing instructions 606-622, and as such embodiments of the computing device 600 include a computing device, mobile device, client device, personal computer, desktop computer, laptop, tablet, video game console, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory.

The processor 602 may fetch, decode, and execute instructions 606-622 to identify a resource personalized to the handwritten annotation in the captured image. In one implementation, upon executing instruction 606, the processor 602 may execute instruction 608 through executing instructions 610-614 and/or instruction 614. In another implementation, upon executing instructions 606-614, the processor 602 may execute instruction 616 through execution of instruction 618-620. In a further implementation, upon executing instructions 606-620, the processor 602 may proceed to execute instruction 622. Specifically, the processor 602 executes instructions 606-614 to: capture the image of printed text, the image includes the handwritten annotation emphasizing content in the printed text; determine the topic of the content within the printed text of the captured image; utilize a feature point to identify an aspect within the content of the printed text to match the feature point to a particular document in a database; using the particular document, identify a portion of the document which corresponds to the captured image; and upon identifying the portion of the document, identify which multiple topics are described in the region. The processor 602 may execute instructions 616-620 to: use the multiple topics to identify multiple resources, each resource corresponds to each of the multiple topics; and determine a relevance score through capturing explicit similarity between the content in the printed text and each of the resources through assigning a relevance score to each of the multiple resources based on the similarity. Additionally, instruction 620 includes extracting the handwritten annotation through a pixilation to determine the location of the handwritten annotation and comparing to the region within the document. The processor 602 may proceed to execute instruction 622 to: identify the resource based on the relevance score and recommend this identified resource to the user as a learning tool.

The machine-readable storage medium 604 includes instructions 606-622 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

As such, examples disclosed herein facilitate the learning process through recommending a resource to a user based on a handwritten annotation. In this manner, the examples personalize the learning process through selecting the resource applicable to the handwritten annotation.

We claim:

1. A non-transitory machine-readable storage medium comprising instructions that when executed by a processor cause a computing device to:

capture an image of printed text and a handwritten annotation of different users, via a camera, wherein the different users annotate different portions of the printed text;

determine a topic as related to the printed text in the image for each one of the different users, wherein to determine the topic comprise the processor causing the computing device to;

utilize a feature point in the image that is captured for identifying an electronic version of a document associated with the image of printed text;

identify a portion of the document corresponding to the image of printed text in the electronic version of the document;

extract multiple topics related to the portion of the document in accordance with a topic model based on analysis of text in the electronic version of the document; and determine multiple resources related to the multiple topics, wherein the resource based on the handwritten annotation is identified from the multiple resources;

identify a resource for each one of the different users based on the handwritten annotation of the different users, the topic related to the printed text, and a form of the resource based on a prior user activity related to whether a user watches videos rather than reading webpages; and provide the resource to each one of the different users in the form that is identified as a learning tool for the handwritten annotation of a respective user in the image of printed text.

2. The non-transitory machine-readable storage medium of claim 1, wherein the handwritten annotation is an emphasis on the printed text in the image.

3. The non-transitory machine-readable storage medium of claim 1, wherein to identify the resource based on the handwritten annotation and the topic related to the printed text comprises instructions that when executed by the processor causes the computing device to:

identify multiple resources based on the topic;

determine a relevance score for each of the multiple resources based on the handwritten annotation and the prior user activity; and identify the resource among the multiple resources based on the relevance score.

4. The non-transitory machine-readable storage medium of claim 1, wherein to capture the image of printed text and a handwritten annotation comprises instructions that when executed by the processor cause the computing device to:

retrieve a document associated with the image of printed text;

identify a region within the document corresponding to the image of printed text; and pre-process the region prior to the instructions to determine the topic related to the printed text.

5. A method comprising:

capturing an image of printed text and a handwritten annotation of different users, wherein the different users annotate different portions of the printed text;

determining a topic related to the printed text in the image or each one of the different users, wherein the determining the topic comprises:

utilize a feature point in the image that is captured for identifying an electronic version of a document associated with the image of printed text;

identify a portion of the document corresponding to the image of printed text in the electronic version of the document;

extract multiple topics related to the portion of the document in accordance with a topic model based on analysis of text in the electronic version of the document; and determine multiple resources related to the multiple topics, wherein the resource based on the handwritten annotation is identified from the multiple resources;

identifying a resource for each one of the different users based on the handwritten annotation of the different users, the topic related to the printed text, and a form of the resource based on a prior user activity related to whether a user watches videos rather than reading webpages; and providing the resource to each one of the different users in the form that is identified as a learning tool for the handwritten annotation of a respective user in the image of printed text.

6. The method of claim 5, wherein the identifying the resource based on the handwritten annotation and the topic related to the printed text comprises:

identifying multiple resources related to the topic of the printed text;

extracting the handwritten annotation from the image of printed text; and ranking each of the multiple resources as relevant to the handwritten annotation to identify the resource.

7. The method of claim 5 comprising:

ranking each of multiple resources as related to the topic for identification of the resource; and delivering the resource as a learning tool for the handwritten annotation in the image of the printed text.

8. The method of claim 5, wherein the handwritten annotation is an emphasis on printed text.

9. The method of claim 5, wherein the determining the topic related to the printed text in the image comprises:

extracting multiple topics from the printed text based on a topic model; and identifying multiple resources, each resource related to each of the multiple topics from the printed text, the resource based on the handwritten annotation is identified from the multiple resources.

10. A system to deliver a resource based on a handwritten annotation and a topic of a printed text, the system comprising:

a recorder to capture an image of the printed text including a handwritten annotation of different users, wherein the different users annotate different portions of the printed text;

a processor; and a non-transitory machine readable storage medium storing instructions that are executed by the processor to:

identify a topic related to the printed text of the image for each one of the different users, wherein to identify the topic comprises the processor to:

utilize a feature point in the image that is captured for identifying an electronic version of a document associated with the image of printed text;

identify a portion of the document corresponding to the image of printed text in the electronic version of the document;

extract multiple topics related to the portion of the document in accordance with a topic model based on analysis of text in the electronic version of the document; and determine multiple resources related to the multiple topics, wherein the resource based on the handwritten annotation is identified from the multiple resources;

identify a resource for each one of the different users based on the handwritten annotation of the different users, the topic related to the printed text, and a form of the resource based on a prior user activity related to whether a user watches videos rather than reading webpages; and provide the resource to each one of the different users in the form that is identified as a learning tool for the handwritten annotation of a respective user in the image of printed text.

11. The system of claim 10, wherein the processor is to provide the resource as a learning tool for the handwritten annotation in the captured image of printed text.

12. The system of claim 10, wherein the processor is to identify multiple resources based on the topic, the processor further to:
   score each of the multiple resources based on the handwritten annotation, how relevant each of the multiple resources are to the topic, and a previous user activity.

* * * * *